(12) United States Patent
Nakashita

(10) Patent No.: US 8,511,833 B2
(45) Date of Patent: Aug. 20, 2013

(54) IMAGE PROJECTION APPARATUS

(75) Inventor: Daisuke Nakashita, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 72 days.

(21) Appl. No.: 12/419,185

(22) Filed: Apr. 6, 2009

(65) Prior Publication Data
US 2009/0268170 A1    Oct. 29, 2009

(30) Foreign Application Priority Data

Apr. 10, 2008  (JP) ................. 2008-102474

(51) Int. Cl.
*G03B 21/16* (2006.01)
*B60Q 1/06* (2006.01)
*F21V 29/00* (2006.01)
*H04N 5/74* (2006.01)

(52) U.S. Cl.
USPC ............................. 353/61; 362/373; 348/748

(58) Field of Classification Search
USPC ................. 353/61, 57, 58, 60, 119; 362/373, 362/294, 345; 348/748; 352/202
See application file for complete search history.

(56) References Cited

U.S. PATENT DOCUMENTS

| | | | |
|---|---|---|---|
| 5,860,719 A | 1/1999 | Suzuki | |
| 6,488,378 B1 | 12/2002 | Tabuchi | |
| 7,014,322 B2 | 3/2006 | Okoshi | |
| 7,367,679 B2* | 5/2008 | Emery | 353/60 |
| 7,607,781 B2* | 10/2009 | Yun et al. | 353/55 |
| 7,618,145 B2* | 11/2009 | Lee et al. | 353/61 |
| 2006/0170876 A1 | 8/2006 | Takemi | |

FOREIGN PATENT DOCUMENTS

| | | |
|---|---|---|
| JP | 9-083914 A | 3/1997 |
| JP | 2005-043602 A | 2/2005 |
| JP | 2006-171165 A | 6/2006 |
| JP | 2007-206576 A | 8/2007 |

* cited by examiner

*Primary Examiner* — William C Dowling
*Assistant Examiner* — Ryan Howard
(74) *Attorney, Agent, or Firm* — Canon USA, Inc., IP Division

(57) ABSTRACT

An image projection apparatus includes a lamp, an air duct configured to lead air from a cooling fan to the inside of a reflector of the lamp, an exhaust duct configured to lead first air, second air, and third air to an exhaust port formed in a housing of the image projection apparatus, the first air passing the inside of the reflector, the second air being drawn from a first inlet port in the housing and passing an area that faces an outer surface of the reflector, and the third air being drawn from a second inlet port formed in the housing, wherein a first area that blends the first air with the third air, and a second area that blends blended area from the first area with the second air and leads resultant air to the exhaust port are provided inside of the exhaust duct.

20 Claims, 8 Drawing Sheets

IMAGE PROJECTION APPARATUS

BACKGROUND OF THE INVENTION

1. Field of the Invention

The present invention relates to an image projection apparatus that uses a lamp to project an image onto a projected surface, such as a screen.

2. Description of the Related Art

A light source of an image projection apparatus, such as a liquid crystal projector, often employs a lamp, such as an ultra high-pressure mercury lamp.

The image projection apparatus that cools the lamp by utilizing a cooling fan in order to maintain the temperature of a light emitting tube in the lamp in a proper range. In general, the lamp includes a reflector, and a light emitting tube arranged inside of the reflector, and each of the inside of the reflector (light emitting tube) and the outer surface of the reflector (outer circumference of the lamp) is cooled by the air.

Usually, the lamp is arranged near an exhaust port formed in the housing of the image projection apparatus, and the air that has cooled the lamp and becomes at a high temperature is immediately exhausted to the outside of the housing by an exhaust fan provided between the lamp and the exhaust port. However, when the high-temperature air that has cooled the lamp is exhausted as it is from the exhaust port, a user near the exhaust port receives hot winds and feels uncomfortable. Thus, it is necessary to make the temperature of the air as low as possible which has cooled the lamp.

Japanese Patent Laid-Open No. 9-83914 discloses an image projection apparatus that uses the air from the fan to cool the lamp, draws the open air into the housing, blends the open air with the air that has cooled the lamp, and exhausts the blended air from the exhaust port. In addition, Japanese Patent Laid-Open No. 2005-43602 discloses an image projection apparatus that includes two air trunks, i.e., one air trunk being configured to cool the inside of the reflector of the lamp, and the other air trunk being configured to cool the outside of the reflector. In this image projection apparatus, the air that has passed two air trunks cools the lamp is then led to an inlet port surface of an exhaust fan by an exhaust duct, blended with the air that has cooled another member on the inlet port surface of the exhaust fan, and exhausted to the outside of the exhaust fan.

However, the image projection apparatuses disclosed in Japanese Patent Laid-Open Nos. 9-83914 and 2005-43602 are configured so that just before the inlet port surface of the exhaust fan, a current of the open air or the air that has cooled another component is joined with a current of the air that has cooled the lamp. Since this configuration insufficiently blends the high-temperature air that has cooled the lamp with the open air or the air that has cooled the other component, the air that has cooled the lamp and remains at a high temperature leaves in part of the exhaust air to the outside of the housing.

BRIEF SUMMARY OF THE INVENTION

The present invention provides an image projection apparatus that can lower the temperature of the whole exhaust air by sufficiently blending low-temperature air with high-temperature air that has cooled the lamp.

An image projection apparatus according to one aspect of the present invention includes a lamp that includes a reflector, and a light emitting tube arranged inside of the reflector, an air duct configured to lead air from a cooling fan to the inside of the reflector, an exhaust duct configured to lead first air, second air, and third air to an exhaust port formed in a housing of the image projection apparatus, the first air passing the inside of the reflector, the second air being drawn from a first inlet port in the housing and passing an area that faces an outer surface of the reflector, and the third air being drawn from a second inlet port formed in the housing, wherein a first area that blends the first air with the third air, and a second area that blends blended area from the first area with the second air and leads resultant air to the exhaust port are provided inside of the exhaust duct.

An image display system according to another aspect of the present invention includes the above image projection apparatus, and an image supply apparatus configured to supply image data to the image projection apparatus.

Further features of the present invention will become apparent from the following description of exemplary embodiments with reference to the attached drawings.

DETAILED DESCRIPTION OF THE EMBODIMENTS

Referring now to the accompanying drawings, a description will be given of embodiments of the present invention.

Figure 1:
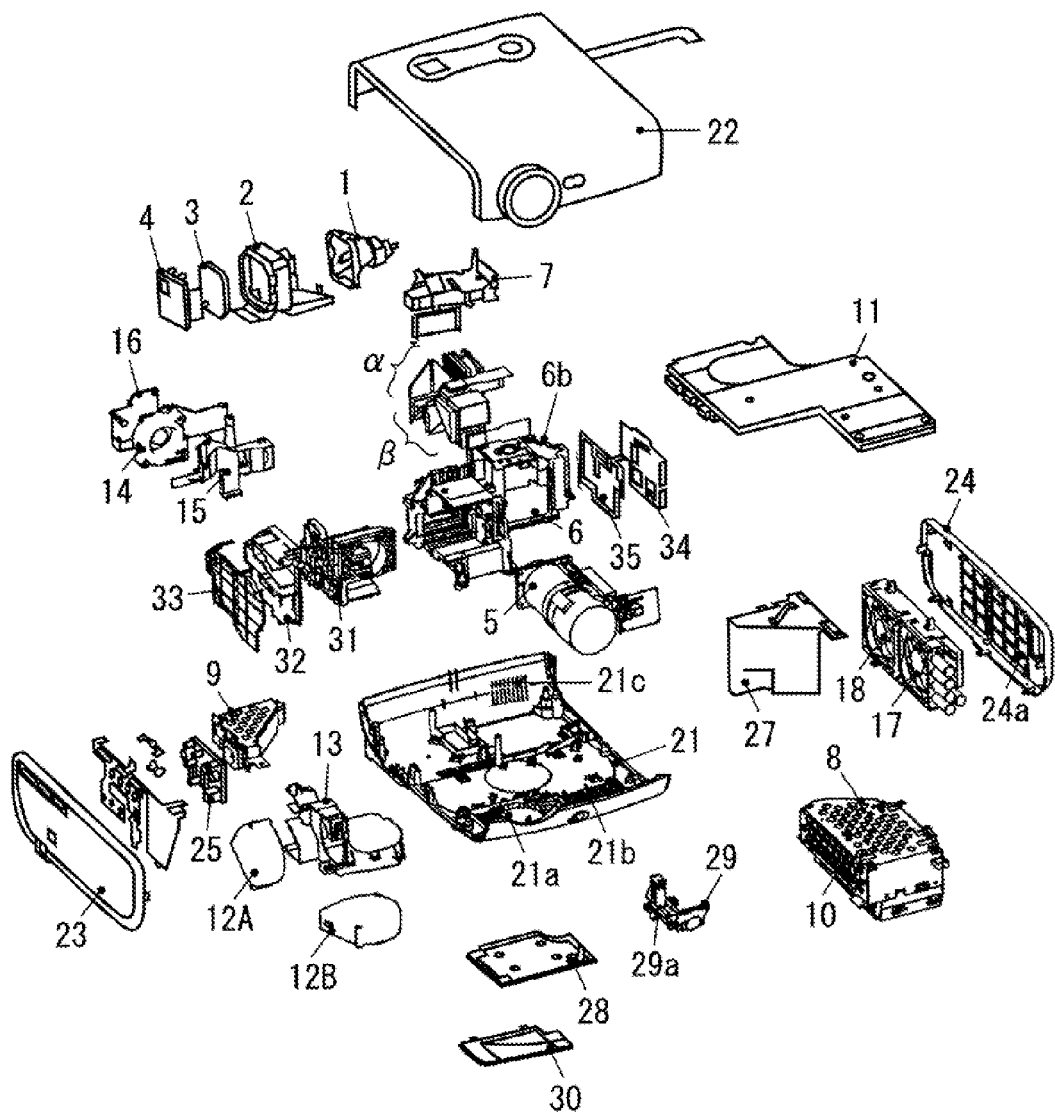
FIG. 1 is an exploded perspective view of a projector according to a first embodiment of the present invention.

FIG. 1 shows an example structure of a liquid crystal projector (image projection apparatus) according to a first embodiment of the present invention.

In the following description, "low" means a side of a bottom surface of the projector (the following bottom panel of a case), and "up" means a side of a top surface of the projector (the following top panel of a case) side. This is true of a case when the projector is hung up side down. In addition, "front" means a side on which that the following projection lens barrel exposes, and "back" means an opposite side of the front side.

In FIG. 1, reference numeral 1 denotes a light source lamp (which will be simply referred to as a "lamp" hereinafter), and this embodiment uses a high-pressure mercury discharge lamp. The light source lamp 1 may use a discharge lamp other than the high-pressure mercury discharge lamp, such as a halogen lamp, a xenon lamp, a metal halide lamp.

Reference numeral 2 denotes a lamp holder configured to hold the lamp 1. Reference numeral 3 denotes an explosion-proof glass. Reference numeral 4 denotes a glass press.

α denotes an illumination optical system configured to convert a luminous flux from the lamp 1 into a parallel luminous flux having a uniform brightness distribution. β denotes a color separation/synthesis optical system configured to color-separate the light from the illumination optical system α, to lead the light to reflective liquid crystal panels (not shown) for three colors of RGB, and to color-synthesize the light from the liquid crystal panels.

Reference numeral 5 denotes a projection lens barrel configured to project the light (image) from the color separation/synthesis optical system β onto a screen (projected surface) (not shown). A projection optical system is housed in the projection lens barrel 5.

Reference numeral 6 denotes an optical box configured to house the lamp 1, the illumination optical system α, and color separation/synthesis optical system β; and the projection lens barrel 5 is fixed onto the optical box 6. In the optical box 6, a lamp box part 6b that houses the light source lamp 1 has an inlet port 6a (see FIGS. 4 to 6).

Reference numeral 7 denotes an optical box lid that covers the optical box 6 while the optical box 6 houses the illumination optical system α and color separation/synthesis optical system β.

Reference numeral 8 denotes a PFC power source substrate configured to generate a DC power source from a commercial power source to each substrate, and reference numeral 9 denotes a power source filter. Reference numeral 10 denotes a ballast power source unit that cooperates with the PFC power source substrate 8 and turns on the lamp 1.

Reference numeral 11 denotes a control substrate configured to control a liquid crystal panel via a RGB substrate, which will be described later, and turning on of the lamp 1.

Reference numerals 12A and 12B denote first and second optical system cooling fans configured to cool an optical element, such as a liquid crystal panel and a polarization plate in the color separation/synthesis optical system β, by drawing air from an inlet port 21a of a bottom panel 21 of a case, which will be described later. Reference numeral 13 denotes a first RGB duct configured to lead a wind from both optical system cooling fans 12A and 12B to the optical element in the color separation/synthesis optical system β.

Reference numeral 14 denotes a lamp cooling fan configured to send a blowing wind to the lamp 1 and to cool the lamp 1. Reference numeral 15 denotes a first lamp duct configured to hold the lamp cooling fan 14 and to introduce the cooling wind to the lamp 1. Reference numeral 16 denotes a second lamp duct configured to hold the cooling fan 14 and to constitute a duct as an air duct in cooperation with the first lamp duct 15.

Reference numeral 17 denotes a power source cooling fan configured to draw air from an inlet port 21b provided in the bottom panel 21, circulates the wind in the PFC power source substrate 8 and the ballast power source unit 10, and cools these components. Reference numeral 18 denotes an exhaust fan configured to exhaust the air that has been sent from the lamp cooling fan 14 to the lamp 1 and cooled them, from an exhaust port 24a formed in a second side plate 24, which will be described later.

The bottom panel 21 houses the lamp 1, the optical box 6, the PFC power source substrate 8, the ballast power source unit 10, and the control substrate 11.

Reference numeral 22 is a top panel of the case configured to cover the bottom panel of the case 21 while the bottom panel of the case 21 houses the optical box 6.

Reference numeral 23 denotes a first side plate configured to close a side surface opening formed in the panels 21 and 22, in cooperation with a second side plate 24. The bottom panel 21 has the above inlet ports 21a and 21b, and the second side plate 24 has the above exhaust port 24a. The bottom panel 21, the top panel 22, the first side plate 23, and the second side plate 24 constitute a housing of the projector.

Reference numeral 25 denotes an interface ("IF") substrate mounted with a connector to receive various types of signals.

Reference numeral 27 denotes an exhaust box configured to introduce the exhaust air from the lamp 1 to the exhaust fan 18 and to prevent diffusions of the exhaust air in the housing.

Reference numeral 28 denotes a lamp lid. The lamp lid 28 is detachably arranged on a bottom surface of the bottom panel 21, and fixed by a screw (not shown). Reference numeral 29 denotes a set adjustment leg. The set adjustment leg 29 is fixed onto the bottom panel 21, and a height of its leg part 29a is adjustable. An inclination angle of the projector can be adjusted by a height adjustment of the leg part 29a.

Reference numeral 30 denotes a RGB inhalation plate configured to hold a dust removal filter (not shown) attached to the outside of the inlet port 21a in the bottom panel 21.

Reference numeral 31 denotes a prism base configured to hold the color separation/synthesis optical system β. Reference numeral 32 denotes a box side cover having a duct shape part configured to lead the cooling winds from the first and second optical system cooling fans 12A and 12B so as to cool the liquid crystal panel and the optical element in the color separation/synthesis optical system β. Reference numeral 33 denotes a second RGB duct configured to form the duct in cooperation with the box side cover 32.

Reference numeral 34 denotes a RGB substrate connected the three liquid crystal panels in the color separation/synthesis optical system β via a flexible substrate, and configured to drive each liquid crystal panel in accordance with a control signal from the control substrate 11. Reference numeral 35 denotes a RGB substrate cover so as not to prevent inclusions of electric noises in the RGB substrate 34.

Figure 2:
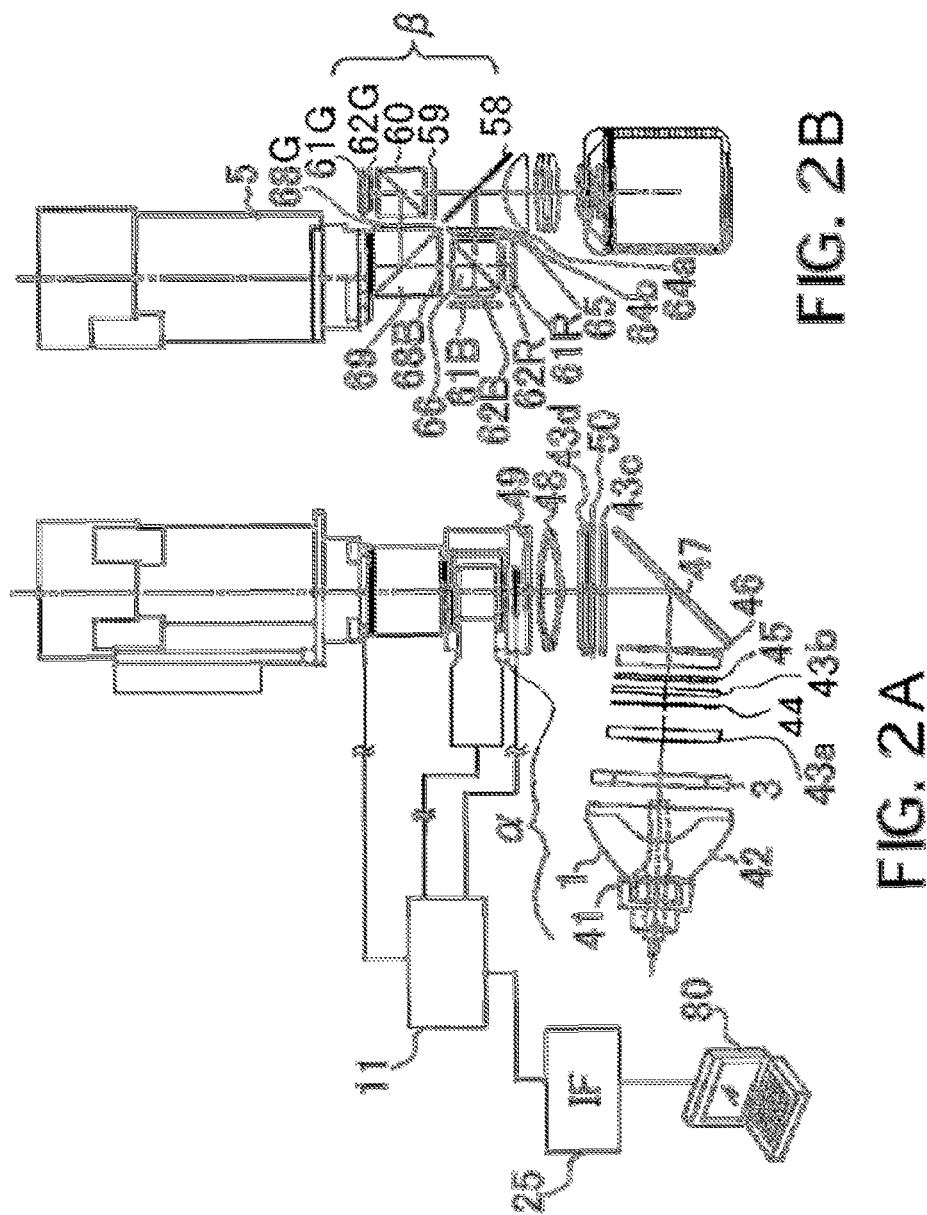
FIGS. 2A and 2B are views showing an optical structure of the projector according to the first embodiment of the present invention.

Referring now to FIGS. 2A and 2B, a description will be given of an optical system that includes the above lamp 1, the illumination optical system α, the color separation/synthesis optical system β, and the projection lens barrel 5.

FIG. 2A is a horizontal section of the optical system, and FIG. 2B is a perpendicular section of the optical system.

In these figures, reference numeral 41 denotes a discharge light emitting tube configured to emit white light with a continuous spectrum (which will be simply referred to as a "light emitting tube" hereinafter). Reference numeral 42 denotes a reflector having a concave mirror configured to condense the light from the light emitting tube 41 onto a predetermined direction. The light emitting tube 41 and the reflector 42 constitutes the light source lamp 1.

Reference numeral 43a denotes a first cylinder array which arranges a plurality of cylindrical lens cells each having a refractive index in the horizontal direction shown in FIG. 2A. Reference numeral 43b denotes a second cylinder array which arranges a plurality of cylindrical lens cells corresponding to individual lens cells in the first cylinder array 43a. Reference numeral 44 denotes an ultraviolet absorption filter, and reference numeral 45 denotes a polarization conversion element configured to convert non-polarized light into predetermined polarized light.

Reference numeral 46 denotes a front compressor that includes a cylindrical lens having a refractive index in the perpendicular direction shown in FIG. 2B. Reference numeral 47 denotes a mirror configured to deflect an optical axis from the lamp 1 by about 90° (more specifically 88°).

Reference numeral 43c is a third cylinder array that arranges a plurality of cylindrical lens cells each having a refractive index in the perpendicular direction. Reference numeral 43d is a fourth cylinder array having a plurality of cylindrical arrays corresponding to individual lens cells in the third cylinder array 43c.

Reference numeral 50 denotes a color filter that returns the color having a specific wavelength region to the lamp 1 so as to adjust the color coordinate to a predetermined value. Reference numeral 48 denotes a condenser lens. Reference numeral 49 denotes a rear compressor that includes a cylindrical lens having a refractive index in the perpendicular direction. The above components constitute the illumination optical system α.

Reference numeral 58 denotes a dichroic mirror configured to reflect light having wavelength regions of blue (B: for example, 430 to 495 nm) and red (R: for example, 590 to 650 nm), and to transmit light having a wavelength region of green (G: 505 to 580 nm). Reference numeral 59 denotes a G-use incident side polarization plate that is made by adhering a polarization element to a transparent substrate, and transmits only the P-polarized light. Reference numeral 60 denotes a first polarization beam splitter configured to transmit the P-polarized light and to reflect the S-polarized light through the polarization separation surface that is made of a multi-layer film.

Reference numerals 61R, 61G, and 61B are a red-use reflective liquid crystal panel, a green-use reflective liquid crystal panel, a blue-use reflective liquid crystal panel each configured to reflect the incident light and to serve as a light modulation element (or image forming element) for image modulations. Reference numeral 62R, 62G, and 62B are a red-use quarter waveplate, a green-use quarter waveplate, and a blue-use quarter waveplate.

Reference numeral 64a denotes a trimming filter configured to return orange light to the lamp 1 so as to improve the color purity of the R light. Reference numeral 64b denotes a RB-use incident side polarization plate made by adhering a polarization element to a transparent substrate, and configured to transmit only the P-polarized light.

Reference numeral 65 denotes a color selective phase plate that converts a polarization direction of the R light by 90°, and maintains a polarization direction of the B light. Reference numeral 66 denotes a second polarization beam splitter configured to transmit the P-polarized light and to reflect the S-polarized light on the polarization separation surface.

Reference numeral 68B denotes a B-use exit side polarization plate (polarization element) configured to rectify only the S-polarized light component in the B light. Reference numeral 68G is a G-use exit side polarization plate configured to transmit only the S-polarized light component in the G light. Reference numeral 69 denotes a dichroic prism configured to transmit the R light and B light and to reflect the G light.

The above components including the dichroic mirror 58 to the dichroic prism 69 constitute the color separation/synthesis optical system β.

In this embodiment, the polarization conversion element 45 converts the P-polarized light into the S-polarized light, but the "P-polarized light" and the "S-polarized light," as used herein, are defined on the basis of the light polarization direction in the polarization conversion element 45. On the other hand, the light incident upon the dichroic mirror 58 is assumed to be the P-polarized light by considering the polarization directions at the first and second polarization beam splitters 60 and 66 to be a reference. In other words, this embodiment defines the light exited from the polarization conversion element 45 as the S-polarized light but defines as the P-polarized light the same S-polarized light when it is incident upon the dichroic mirror 58.

Next follows a description of an optical operation. The light emitted from the light emitting tube 41 is condensed onto a predetermined direction by the reflector 42. The reflector 42 has a paraboloidal concave mirror, and the light from the focus position of the paraboloid becomes a luminous flux parallel to the symmetrical axis of the paraboloid. Since the light source from the light emitting tube 41 is not an ideal point light source but has a finite size, the condensed luminous flux contains many light components that are unparallel to the symmetrical axis of the paraboloid. The luminous flux is incident upon the first cylinder array 43a. The light flux incident upon the first cylinder array 43a is divided into a plurality of luminous fluxes corresponding to the number of cylinder lens cells, condensed, and become a plurality of band-shaped luminous fluxes that are arranged in the perpendicular direction. The plurality of split luminous fluxes form a plurality of light source images near the polarization conversion element 45 via the ultraviolet absorption filter 44 and the second cylinder array 43b.

The polarization conversion element 45 has a polarization separation surface, a reflection surface, and a half waveplate. A plurality of luminous fluxes are incident upon the polarization separation surface corresponding to their rows, and are divided into the transmitting P-polarized light component and the reflected S-polarized light component. The reflected S-polarized light component is reflected on the reflection surface, and exited in the same direction as the P-polarized light component. On the other hand, the P-polarized light component that has transmitted the polarization separation surface transmits the half waveplate, and is converted into the same polarization component as the S-polarized light component. Thus, a plurality luminous fluxes having the same polarization direction are emitted.

A plurality of polarization-converted luminous fluxes exit the polarization conversion element 45, then are compressed by the front compressor 46, are reflected on the mirror 47 by an angle of 88°, and are incident upon the third cylinder array 43c.

The luminous flux incident upon the third cylinder array 43c is split into a plurality of luminous fluxes corresponding to the number of cylinder lens cells, condensed, and converted into a plurality of band-shaped luminous fluxes that are arranged in the horizontal direction. The plural split luminous fluxes are incident upon the rear compressor 49 via the fourth cylinder array 43d and the condenser lens 48.

Due to the optical operations of the front compressor 46, the condenser lens 48, and the rear compressor 49, rectangular images formed by the plural luminous fluxes overlap each other, and form a rectangular illumination area having a uniform brightness. The reflective liquid crystal panels 61R, 61G, and 61B are arranged in this illumination area.

The light that has been converted into the S-polarized light by the polarization conversion element 45 is incident upon the dichroic mirror 58. A description will now be given of an optical path of the G light that has passed the dichroic mirror 58.

The G light that has transmitted the dichroic mirror 58 is incident upon the incident side polarization plate 59. The G light has become the P-polarized light (or S-polarized light when the polarization conversion element 45 is used as a reference) even after separated by the dichroic mirror 58. The G light is exited from the incident side polarization plate 59, then is incident as the P-polarized light upon the first polarization beam splitter 60, transmits the polarization separation surface, and goes to the G-use reflective liquid crystal panel 61G.

An image supply apparatus 80, such as a personal computer, a DVD player, and a TV tuner, is connected to the IF substrate 25 of the projector. The control substrate 11 drives the reflective liquid crystal panels 61R, 61G, and 61B based on the image information input from the image supply apparatus 80, and forms an original image for each color. Thereby, the luminous flux incident upon each reflective liquid crystal panel is reflected and (image-)modulated in accordance with the original image. The image supply apparatus 80 and the projector constitute an image display system.

The G-use reflective liquid crystal panel 61G image-modulates and reflects the G-light. The P-polarized light component in the image-modulated G light again transmits the polarization separation surface of the first polarization beam splitter 60, is returned to the light source side, and is removed from the projection light. On the other hand, the S-polarized light component in the image-modulated G light is reflected on the polarization separation surface of the first separation beam splitter 60, and goes as the projection light to the dichroic prism 69.

In this case, when all the polarized light components are converted into the P-polarized light components (or in a black display state), a slow axis of a quarter waveplate 62G is adjusted to a predetermined direction which is provided between the first polarization beam splitter 60 and the G-use reflective liquid crystal panel 61G. Thereby, the influence of a disturbance of the polarization state that occurs in the first polarization beam splitter 60 and the G-use reflective liquid crystal panel 61G.

The G light emitted from the first polarization beam splitter 60 is incident as the S-polarization light upon the dichroic prism 69, is reflected on the dichroic film surface of the dichroic prism 69, and goes to the projection lens barrel 5.

On the other hand, the R light and the B light reflected on the dichroic mirror 58 are incident upon the trimming filter 64a. Each of the R light and the B light is the P-polarized light even after separated by the dichroic mirror 58. After the orange light component of each of the R light and the B light is cut by the trimming filter 64a, the R light and the B light transmit the incident side polarization plate 64b, and are incident upon the color selective phase plate 65.

The color selective phase plate 65 serve to rotate a polarization direction of only the R light by 90°, and thereby the R light is incident as the S-polarized light and the B light is incident as the P-polarized light upon the second polarization beam splitter 66.

The R light that is incident as the S-polarized light upon the second polarization beam splitter 66 is reflected on the polarization separation surface of the second polarization beam splitter 66, and goes to the R-use reflective liquid crystal panel 61R. In addition, the B light incident as the P-polarized light upon the second polarization beam splitter 66 transmits the polarization separation surface of the second polarization beam splitter 66, and goes to the B-use reflective liquid crystal panel 61B.

The R light incident upon the R-use reflective liquid crystal panel 61R is image-modulated and reflected. The S-polarized light component in the image-modulated R light is again reflected on the polarization separation surface of the second polarization beam splitter 66, returned to the light source side, and removed from the projection light. On the other hand, the P-polarized light component in the image-modulated R light transmits the polarization separation surface of the second polarization beam splitter 66, and goes to the dichroic prism 69 as the projection light.

In addition, the B light incident upon the B-use reflective liquid crystal panel 61B is image-modulated and reflected. The P-polarized light component in the image-modulated B light again transmits the polarization separation surface of the second polarization beam splitter 66, is returned to the light source side, and is removed from the projection light. On the other hand, the S-polarized light component in the image-modulated B light is reflected on the polarization separation surface of the second beam splitter 66, and goes as projection light to the dichroic prism 69.

At this time, by adjusting the slow axes of the quarter waveplates 62R and 62B provided between the second polarization beam splitter 66 and the R-use and B-use reflective liquid crystal panels 61R and 61B, the black display states of the R light and the B light can be adjusted, similar to the G light.

Thus, the R light and the B light synthesized into one luminous flux and exited from the second polarization beam splitter 66 are detected by the exit side polarization plate 68B and incident upon the dichroic prism 69. In addition, the R light transmits as the P-polarization light the exit side polarization plate 68B, and is incident upon the dichroic prism 69.

By the detection at the exit side polarization plate 68B, the B light becomes light from which an invalid component is cut, which is generated when the B light passes the second polarization beam splitter 66, the B-use reflective liquid crystal panel 61B, and the quarter waveplate 62B.

The R light and the B light that are incident upon the dichroic prism 69 transmit the dichroic film surface, is synthesized with the G light reflected on the dichroic film surface, and goes to the projection lens 5.

The synthesized R light, G light, and B light are enlarged and projected on the projected surface, such as a screen, by the projection lens 5.

Figure 3:
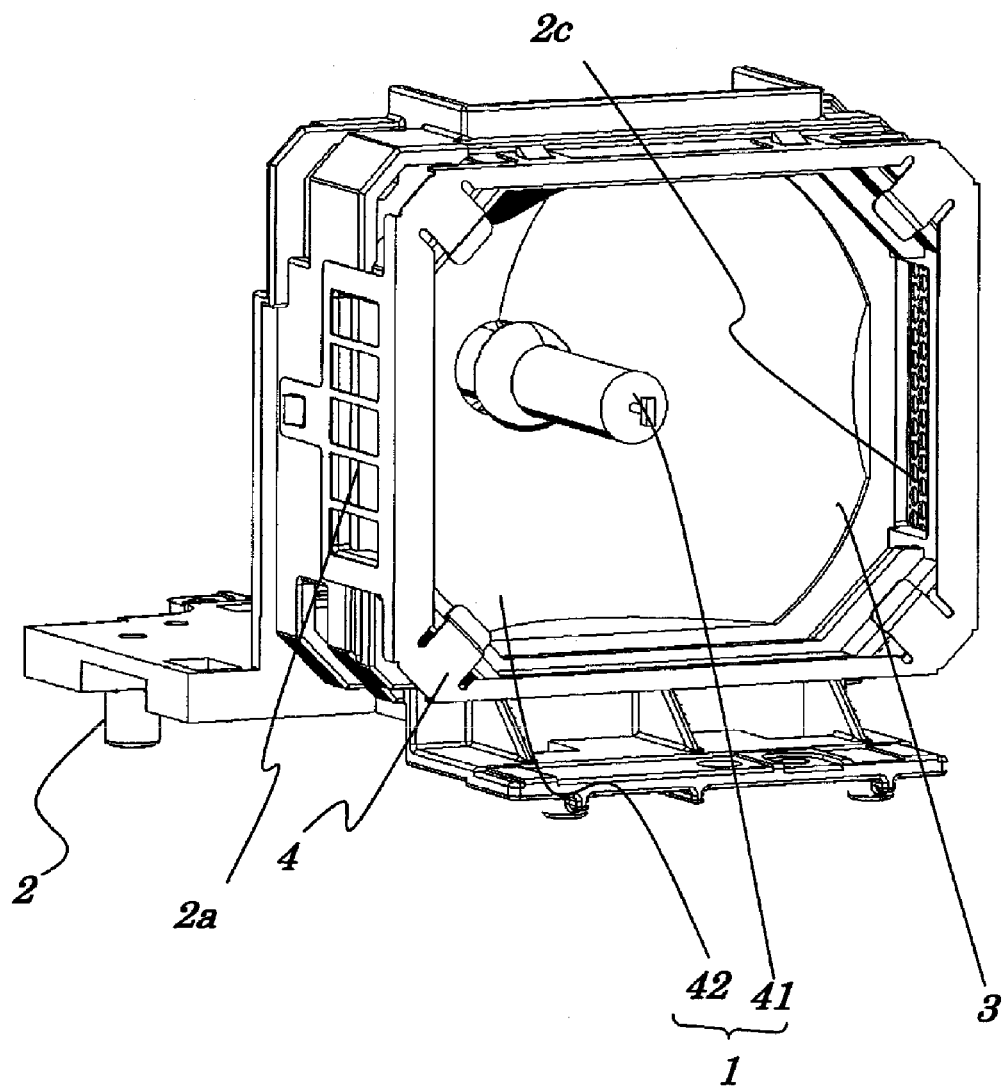
FIG. 3 is a perspective view showing a lamp and a lamp holder in the projector according to the first embodiment of the present invention.
Figure 4:
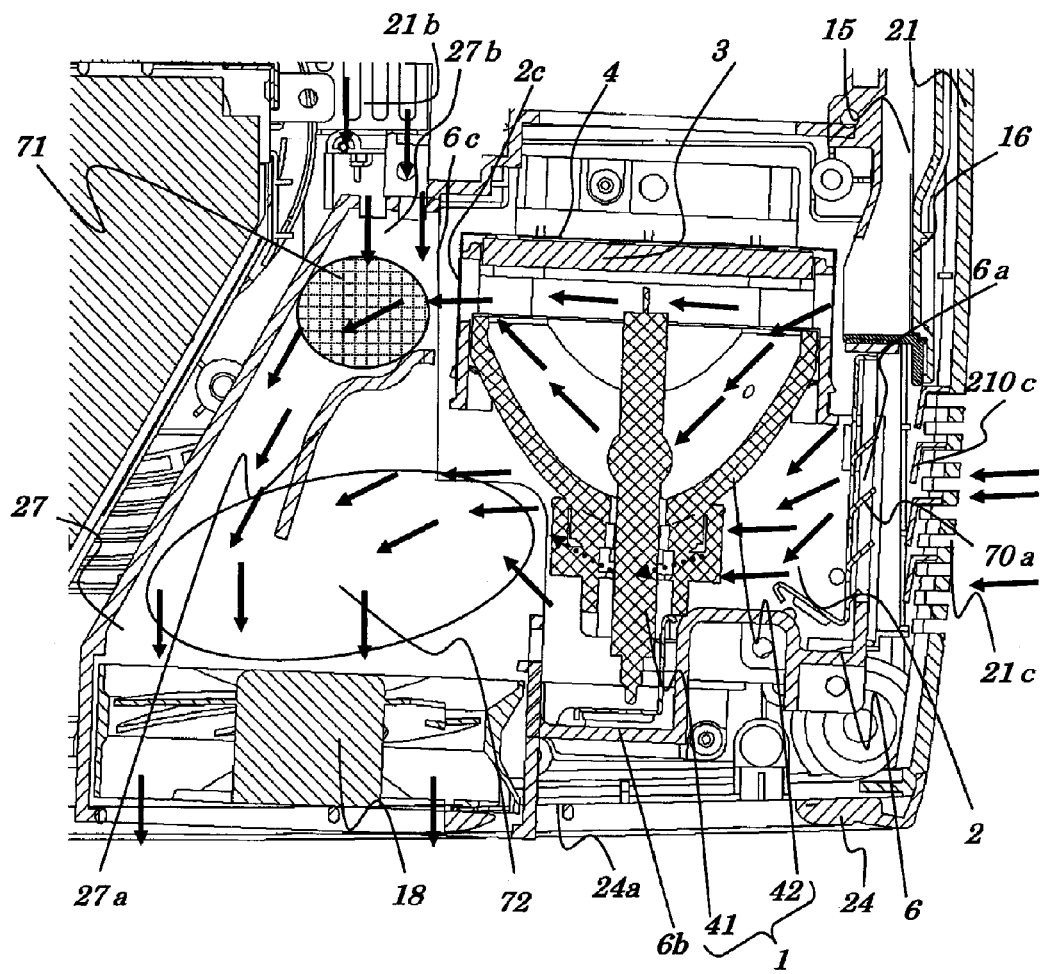
FIG. 4 is a sectional view showing a structure and an air current around the lamp in the projector according to the first embodiment of the present invention.

Referring now to FIGS. 3 and 4, a description will be given of a lamp cooling structure of this embodiment. FIG. 3 is an enlarged view of the lamp holder 2 and the lamp 1. FIG. 4 shows a vicinity of the lamp box part 6b in the optical box 6.

In FIG. 3, the lamp holder 2 holds the lamp 1 via the lamp holding member (not shown). The explosion-proof glass 3 is provided on a front surface of the lamp holder 2, and the explosion-proof glass 3 and the lamp holder 2 are held by the glass press 4.

The lamp holder 2 and the lamp 1 held by the lamp holder 2 are housed in the inside of the above lamp box part 6b.

When the projector is powered on and the light emitting tube 41 of the lamp 1 emits the light, the temperature of the lamp 1 rises and the temperature inside of the lamp box part 6b also rises due to the heat from the lamp 1.

An inflow port 2a is formed on a side surface of the lamp holder 2. An outflow port of the duct (air duct) formed by the first and second lamp ducts 15 and 16 opposes to the inflow port 2a.

The cooling wind (air), which is sent from the lamp cooling fan 14 that starts rotating after the power is turned on, flows in (or is led to the inside of) the reflector 42 of the lamp 1 arranged in the lamp box part 6b through the above ducts 15 and 16 and the inflow port 2a, as shown by an arrow in FIG. 4. The cooling wind that has flowed in the reflector 42 is blown against the internal surface of the reflector 42 and the spherical light emitting part 41a of the light emitting tube 41, and cools these components.

Air that has cooled the inside of the reflector 42, which will be referred to as a "first air" hereinafter, is exhausted from the lamp box part 6*b* through the inflow port 2*c* formed in the lamp holder 2 and the outflow port 6*c* formed in the lamp box part 6*b*. Due to the rotations of the exhaust fan 18, the air exhausted from the lamp box part 6*b* flows in the first chamber (first area) 71 formed in the exhaust box 27 as an exhaust duct. The exhaust fan 18 is arranged between the exhaust box 27 and the exhaust port 24*a*.

A wind guide wall part 27*a* is provided as a first wall part is provided in the exhaust box 27, and integrally molded with the exhaust box 27. The inside of the exhaust box 27 is divided by the wind guide wall part 27*a* into the above first chamber 71 and a second chamber 72 that is closer to the exhaust port than (or downstream of) the first chamber 71. The term "divide," as used herein, means that the division can allow a current of an air from the first chamber 71 to the second chamber 72.

In addition, an inlet port 27*b* is formed in a wall surface that faces the first chamber 71 in the exhaust box 27. The above inlet port 21*b* is formed near the inlet port 27*b* in the bottom panel 21. Therefore, as the exhaust fan 18 rotates, air outside the housing or the open air (which will be referred to as "third air" hereinafter) flows in the first chamber 71 through the inlet ports 21*b* and 27*b*.

The first air that has flowed in the first chamber 71 through the outflow ports 2*c* and 6*c* is agitated (blended), in the first chamber 71, with the third air that has flowed through the inlet ports 21*b* and 27*b*. The wind guide wall part 27*a* serves as resistance to the air current and promotes the agitation. Thus, the bended air that is made as a result of the agitation in the first chamber 71 has a temperature lower than that of the first air that has cooled the inside of the reflector, and flows in the second chamber 72.

On the other hand, the (second) inlet port 21*c* is formed on the back wall surface of the bottom panel 21. Moreover, the inlet port (opening) 6*a* is formed at a position opposite to the inlet port 21*c* in the lamp box part 6*b*. The light shielding members 210*c* and 70*a* are provided at the inlet port 21*c* and 6*a*. These light shielding members 210*c* and 70*a* shield the light that goes from the lamp 1 to the inlet ports 6*a* and 21*c* so as to prevent a leakage of the light to the outside.

Although not shown, a light shielding louver may be provided in the exhaust box 27, which shields the light that goes from the lamp 1 to the exhaust box 27. Thereby, the light that directs from the lamp 1 to the exhaust box 27 is shielded and prevented from leaking from the exhaust port 24*a* to the outside of the housing.

The air outside the housing (or the open air) is drawn in the housing through the inlet port 21*c* by the drawing force of the exhaust fan 18, as shown by an arrow in FIG. 4, as the exhaust fan 18 rotates after the power is turned on. The drawn open air is taken in an area that faces the outer surface of the reflector 42 in the lamp box part 6*b* through the inlet port 6*a*, and cools the outer surface of the reflector 42, an electrode part 41*b* that projects to the outside of the reflector 42 and its surrounding in the light emitting tube 41.

The air that has cooled the outer surface of the reflector 42 and the electrode part 41*b* of the light emitting tube 41, which will be referred to as "second air" hereinafter, flows in the second area 72 in the exhaust box 27 through the inflow port 6*c* of the lamp box part 6*b*, and is agitated (blended) with the blended air from the first chamber 71. Thus, the air agitated in the second chamber 72 is exhausted to the outside of the housing from the exhaust port 24*a* by the rotations of the exhaust fan 18.

Thus, the high-temperature first air that has cooled the inside of the reflector 42 (light emitting part 41*a*) is blended, in the first chamber 71, with the third air drawn from the outside of the housing through the inlet port 21*b* and cooled. The blended air is blended, in the second chamber 72, with the comparatively low-temperature second air that has been taken from the outside of the housing through the inlet port 21*c*, and cooled the outer surface of the reflector 42, and further cooled.

Thus, the air that has been sufficiently blended (agitated) in the exhaust box 27 and has a temperature that is sufficiently lower than that of the high-temperature first air that has cooled the inside of the reflector 42 is exhausted to the outside of the housing from the exhaust port 24*a* by the exhaust fan 18. The exhaust air from the exhaust port 24*a* is entirely (or uniformly) low-temperature air that does not contain a high-temperature air.

This embodiment can obtain entirely good exhaust air reduction effect only by forming the inlet port 27*b* in the exhaust duct 27 and the wind guide wall part 27*a* between the first and second tunnel chambers 71 and 72 in the exhaust duct 27 without a passage of a new member.

Figure 5:
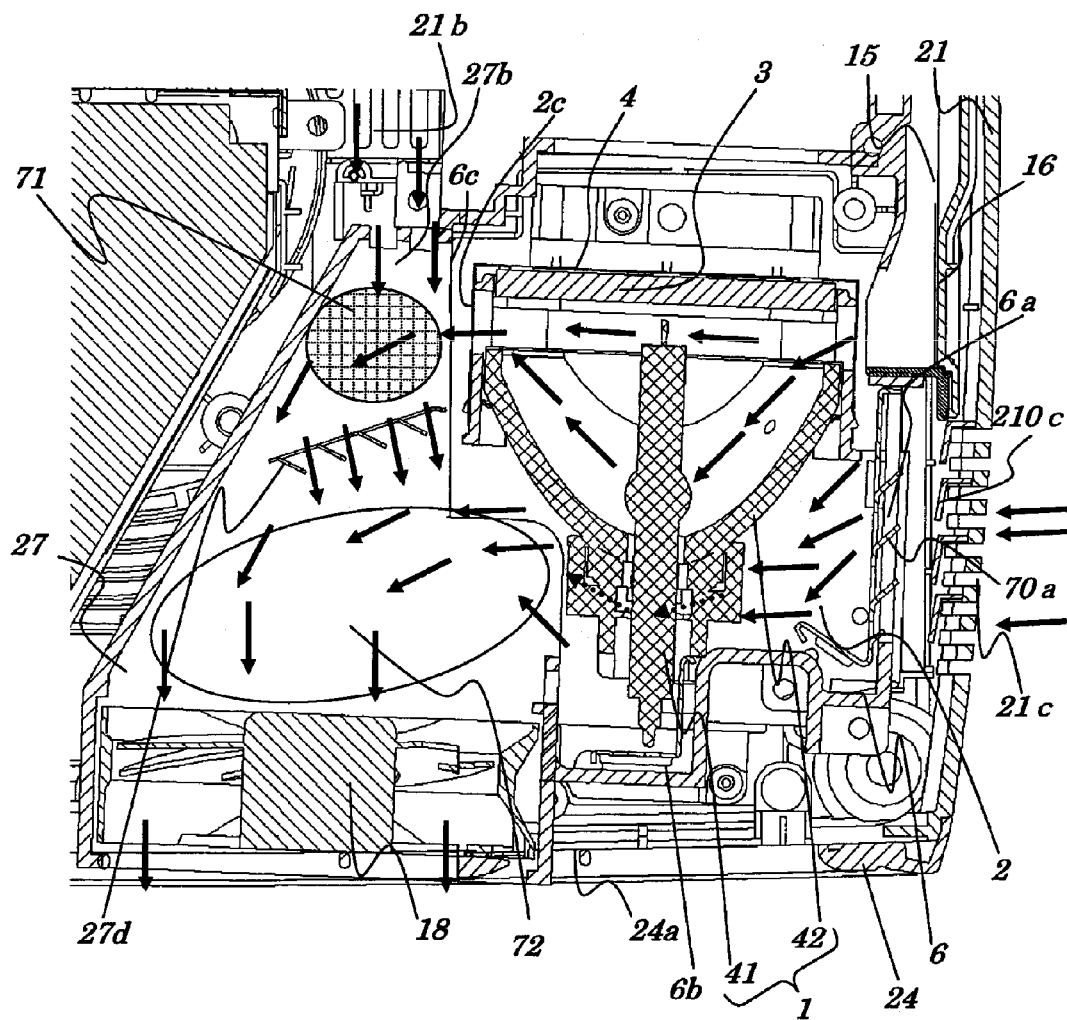
FIG. 5 is a sectional view showing a structure and an air current around a lamp in a projector according to the second embodiment.

FIG. 5 shows a lamp cooling structure in a projector according to a second embodiment of the present invention. The projector of this embodiment has the same basic structure as that of the first embodiment shown in FIGS. 1 and 2A and 2B, and those elements in this embodiment, which are common to the first embodiment, are designated by the same reference numerals of the first embodiment.

Instead of the wind guide wall part 27*a* that has no opening described in the first embodiment, this embodiment provides an air guide louver 27*d* as an wind guide wall part having an opening, as shown in FIG. 5, for a member that divides the inside of the exhaust box 27 into the first chamber 71 and the second chamber 72. The air guide louver 27*d* has a plurality of openings and a light shielding member configured to shield the light that has moved from the lamp 1 into the exhaust box 27.

Even in this embodiment, the high-temperature first air that has cooled the inside of the reflector 42 flows in the first chamber 71 in the exhaust box 27 through the inflow port 6*c* of the lamp box 6*b*. The first air is blended (agitated), in the first chamber 71, with the third air that has been drawn in the first chamber 71 through the inlet port 21*b* of the lower panel 21 and the inlet port 27*b* formed in the exhaust box 27. The air guide louver 27*d* serves as resistance to the air current, and promotes the agitation. Thus, the blended air that is agitated in the first chamber 71 and has a temperature that is lowered than that of the first temperature just after it has cooled the inside of the reflector 42 flows in the second chamber 72 through a plurality of openings of the air guide louver 27*d*.

This blended air is agitated (blended) with the second air that has been taken into the housing through the inlet port 21*c* and has cooled the outer surface of the reflector 42. Thus, the air that is agitated in the second chamber 72 and has an entirely lowered temperature is exhausted to the outside of the housing from the exhaust port 24*a* by the rotations of the exhaust fan 18.

This embodiment can restrain the temperature rise of the air in the first chamber 71 since the air smoothly flows from the first chamber 71 to the second chamber 72 through the plural openings of the air guide louvers 27*d*. Thereby, the temperature rise of part that faces the first chamber 71 on the wall surface of the exhaust box 27 can be prevented.

Figure 6:
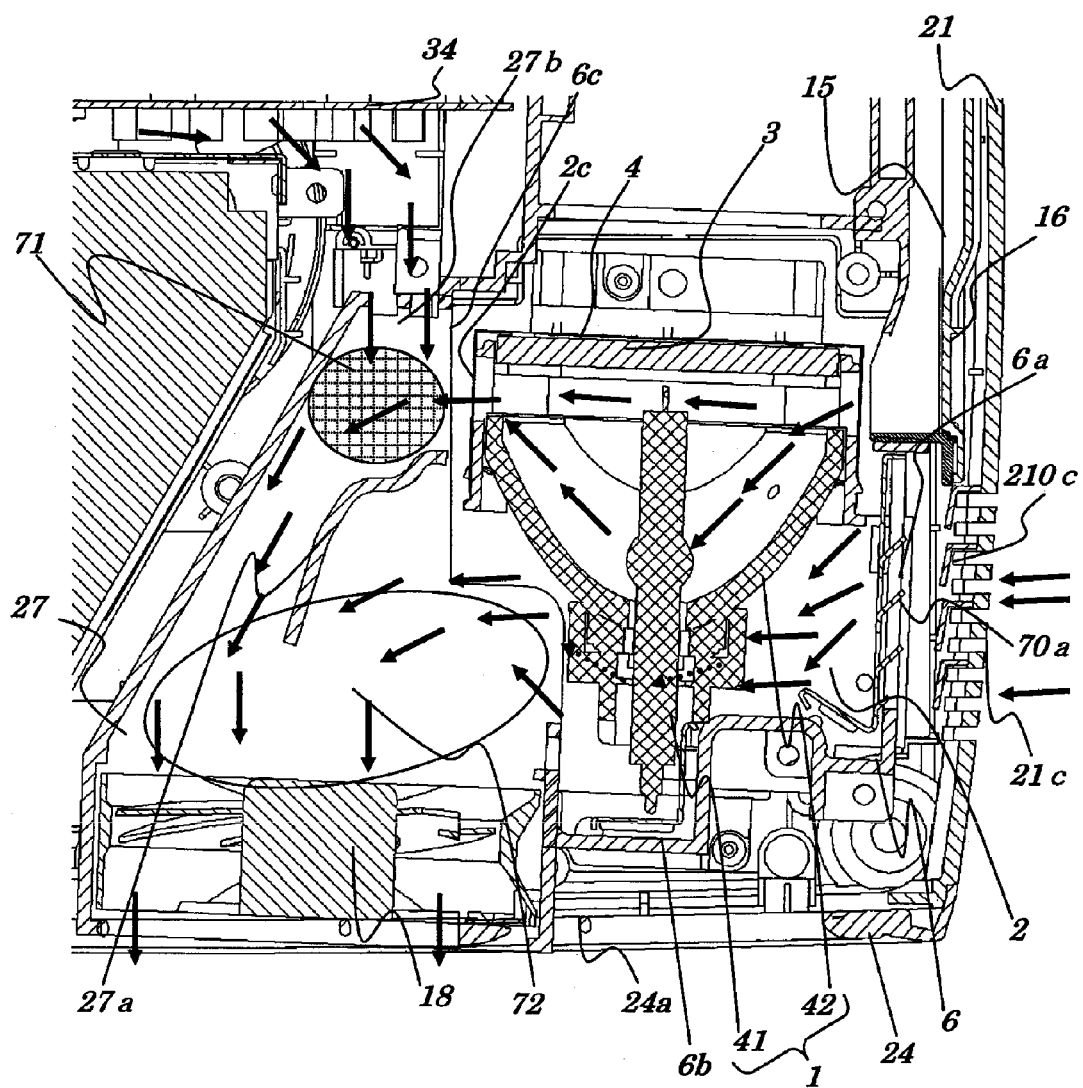
FIG. 6 is a sectional view showing a structure and an air current around a lamp in a projector according to the third embodiment.

FIG. 6 shows a lamp cooling structure in a projector according to a third embodiment of the present invention. The projector of this embodiment has the same basic structure as that of the first embodiment shown in FIGS. 1 and 2A and 2B, and those elements in this embodiment, which are common to the first embodiment, are designated by the same reference numerals of the first embodiment.

This embodiment provides an RGB substrate 34 near the inlet port 27b provided in the exhaust box 27, as shown in FIG. 6.

As the exhaust fan 18 rotates, the air outside of the housing (or the open air) is drawn through an inlet port (not shown) (which may be the inlet port 21b) provided in the bottom panel 21, and the air flows along devices (a component other than the lamp) mounted on the RGB substrate 34 and cools these devices. The (third) air that has cooled the devices on the RGB substrate 34 flows in the first wind tunnel channel 71 in the exhaust box 27 through the inlet port 27b provided in the exhaust box 27, and is blended (agitated) with the (first) air that has cooled the inside of the reflector 42, similar to the first embodiment.

The blended air, similar to the first embodiment, is blended (agitated), in the second chamber 72, with the second air that cooled the outer surface of the reflector 42, and exhausted to the outside of the housing from the exhaust port 24a.

The air flowing from the inlet port 27b to the first chamber 71 is the air that has cooled the devices on the RGB substrate 34 but its temperature is sufficiently lower than the air that has just cooled the inside of the reflector 42. Thus, it is less likely to cause a temperature rise of the air exhausted from the exhaust port 24a.

This embodiment utilizes the air current to the first chamber 71 which serves to lower the exhaust air temperature to cool the devices on the RGB substrate 34, and dispenses with a cooling fan configured to cool the devices on the RGB substrate 34.

Figure 7:
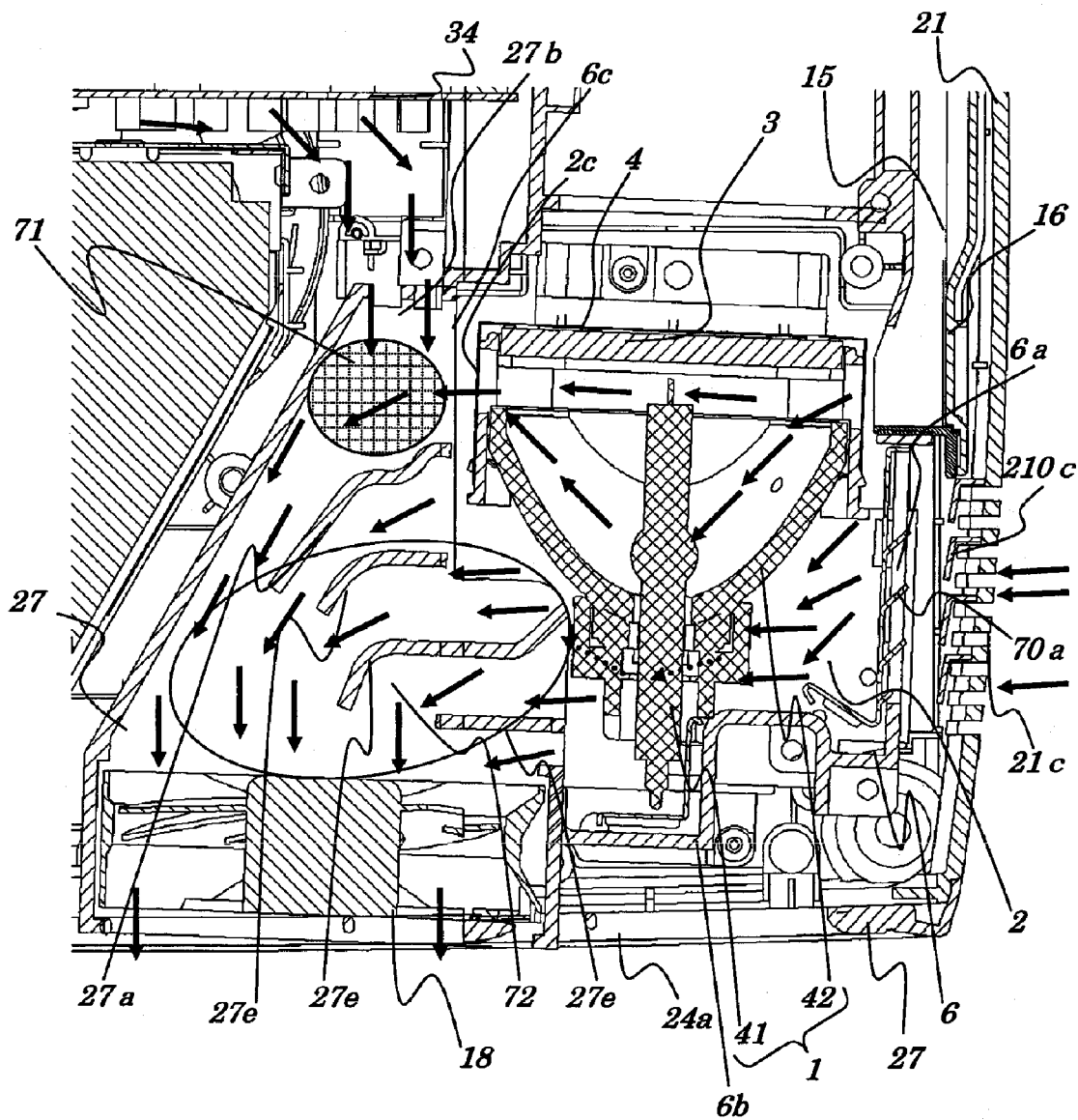
FIG. 7 is a sectional view showing a structure and an air current around a lamp in a projector according to a fourth embodiment.
Figure 8:
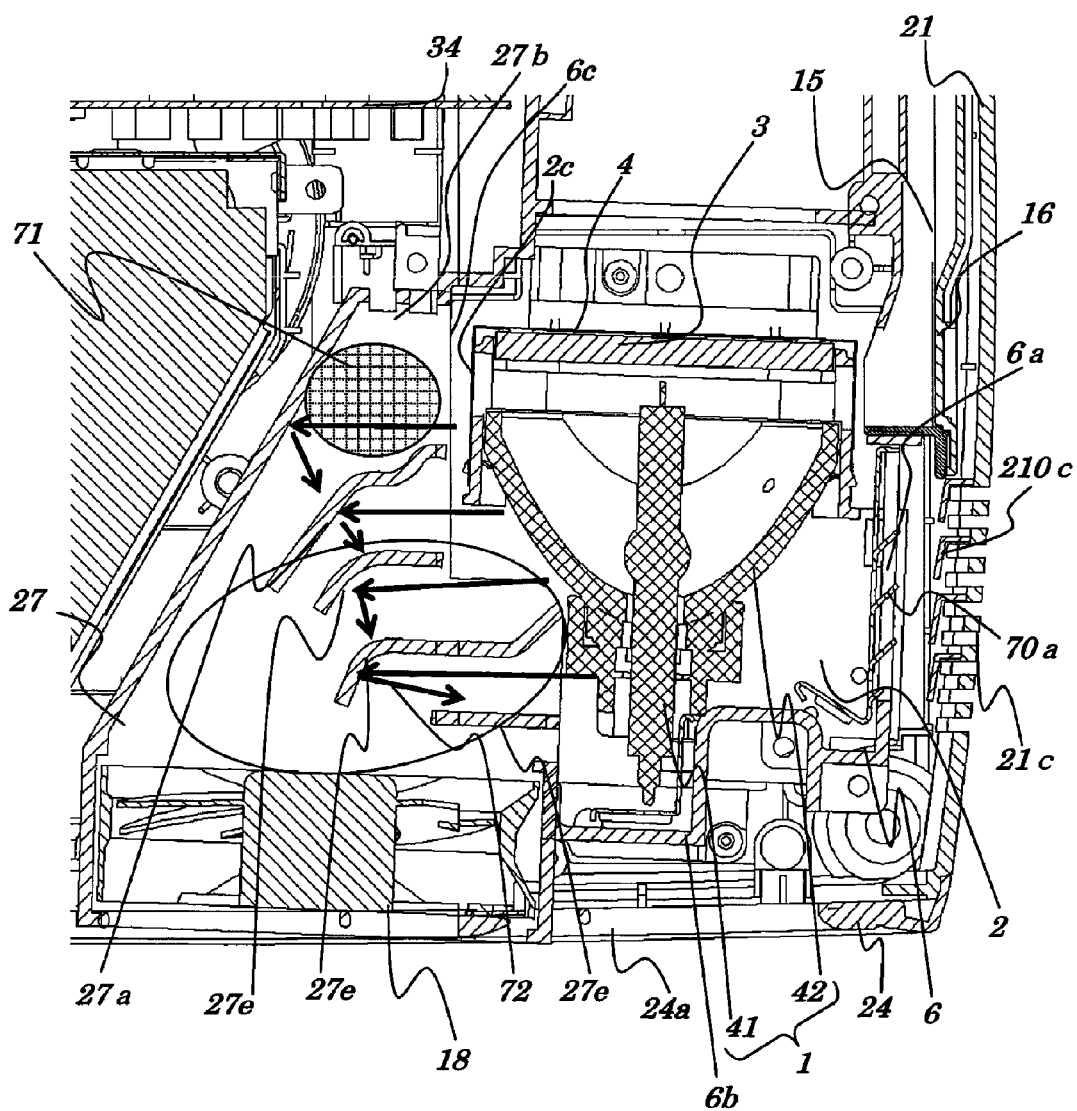
FIG. 8 is a sectional view showing the structure and the air current around the lamp in the projector according to the fourth embodiment of the present invention.

FIGS. 7 and 8 show a lamp cooling structure of a projection according to a fourth embodiment of the present invention. The projector of this embodiment has the same basic structure as that of the first embodiment shown in FIGS. 1 and 2A and 2B, and those elements in this embodiment, which are common to the first embodiment, are designated by the same reference numerals of the first embodiment.

This embodiment provides the exhaust box 27 with the wind guide wall part 27a described in the first embodiment, as shown in FIG. 7. Moreover, this embodiment provides the plurality of wind guide wall parts (second wall parts) 27e configured to divide an inflow channel of the (second) air that has cooled the outer surface of the reflector 42 in the second box 27 into plural channels. The plural wind guide wall parts 27e improve the agitation degree between the second air and the blended air from the first chamber 71 in the second chamber 72.

Moreover, the plural wind guide wall parts 27e can make uniform the wind velocity of the air flowing in the exhaust fan 18 through the second chamber 72. As a result, it is possible to avoid a deterioration of the aerodynamic characteristic of the exhaust fan 18, and to reduce noises accruing from the exhaust fan 18.

In addition, as shown in FIG. 8, a plurality of air guide walls 27a and 27e serves as a light shielding function that shields the light emitted from the lamp 1 to the exhaust box 27 and prevents a leakage of the light to the outside from the exhaust port 24a. Therefore, it is unnecessary to add a new component configured to shield the light to the inside of the exhaust box 27.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-102474, filed on Apr. 10, 2008, which is hereby incorporated by reference herein in its entirety.

What is claimed is:

1. An image projection apparatus comprising:
a lamp having a reflector and a light emitting tube arranged inside of the reflector, wherein an air duct of the image projection apparatus is configured to lead cooling air from a cooling fan to the inside of the reflector;
an exhaust duct having a first inlet port, an interior configured to receive heated air that has passed over the lamp, an exhaust port leading to outside of a housing of the image projection apparatus; and
a first wall that divides the interior of exhaust duct into a first area and a second area that is separate from the first area,
wherein the cooling air is passed through an inside of the reflector to form first air, air drawn from a second inlet port is passed over an area that faces an outer surface of the reflector to form second air, and air drawn from the first inlet port constitutes third air,
wherein the first air and the third air are blended in the first area to form first blended air, and wherein the first wall guides the first blended air and the second air into the second area to be blended before being sent through the exhaust port to outside of the housing, and
wherein the first inlet port is provided in a duct of the first air after the lamp.

2. The image projection apparatus according to claim 1, further comprising an exhaust fan positioned at the exhaust port and configured to exhaust air from the exhaust port,
wherein, in response to rotation of the exhaust fan, air is drawn though the second inlet port and the first inlet port.

3. The image projection apparatus according to claim 1, wherein the air being drawn from the first inlet port cools a component other than the lamp in the housing before being drawn from the first inlet port and into the interior of the exhaust duct.

4. The image projection apparatus according to claim 1, wherein the second area has a second wall that divides an inflow channel of the second area into plural channels.

5. The image projection apparatus according to claim 4, wherein the second wall prevents light from the lamp leaking through the exhaust port.

6. The image projection apparatus according to claim 1, further comprising a light shielding member configured to shield light from the lamp to the second inlet port.

7. The image projection apparatus according to claim 1, wherein the first wall prevents light from the lamp leaking through the exhaust port.

8. The image projection apparatus according to claim 1, wherein the second inlet port is configured to draw air that is outside of the housing into the housing.

9. The image projection apparatus according to claim 1, wherein the first inlet port is configured to draw air that is outside of the housing into the housing.

10. The image projection apparatus according to claim 1, wherein the first wall part has a surface that serves as a resistance to an air flow drawn from the first inlet port.

11. The image projection apparatus according to claim 1, wherein the second inlet port is arranged on a straight line orthogonal to a straight line from the first inlet port toward the exhaust port.

12. The image projection apparatus according to claim 1, wherein an inlet port surface of the first inlet port is arranged on a straight line orthogonal to a straight line from an inlet port surface of the second inlet port.

13. The image projection apparatus according to claim 1, wherein the first air that has passed through the inside of the reflector and the third air that has been drawn from the first inlet port are flowed in the exhaust duct from different directions.

14. The image projection apparatus according to claim 1, wherein the third air drawn from the first inlet port is exhausted through the exhaust port without passing through the lamp.

15. The image projection apparatus according to claim 1, wherein the exhaust port is provided on a different surface on the housing from the second inlet port.

16. The image projection apparatus according to claim 1, wherein the reflector is arranged between the second inlet port and the first wall to train an aperture plane of the reflector in a direction orthogonal to a direction in which the second inlet port and the wall align.

17. The image projection apparatus according to claim 1, wherein the second area is situated between the first area and the exhaust port.

18. The image projection apparatus according to claim 1, wherein the first wall has a surface that serves as a resistance to a flow of the third air to agitate the first air and the third air in the first area.

19. The image projection apparatus according to claim 1, wherein the first inlet port and the exhaust port are provided in an area opposite to the second inlet port with respect to an optical axis of the lamp,
   wherein the first wall is located between the first inlet port and the exhaust port, and
   wherein the first wall has a surface that serves as a resistance to an air flow drawn from the first inlet port to the exhaust port.

20. An image display system comprising:
   an image projection apparatus including,
   a lamp having a reflector and a light emitting tube arranged inside of the reflector, wherein an air duct of the image projection apparatus is configured to lead cooling air from a cooling fan to the inside of the reflector,
   an exhaust duct having a first inlet port, an interior configured to receive heated air that has passed over the lamp, an exhaust port leading to outside of a housing of the image projection apparatus, and
   a first wall that divides the interior of exhaust duct into a first area and a second area that is separate from the first area; and
   an image supply apparatus configured to supply image data to the image projection apparatus,
   wherein, the cooling air is passed through an inside of the reflector to form first air, air drawn from a second inlet port is passed over an area that faces an outer surface of the reflector to form second air, and air drawn from the first inlet port constitutes third air,
   wherein the first air and the third air are blended in the first area to form first blended air, and wherein the first wall guides the first blended air and the second air into the second area to be blended before being sent through the exhaust port to outside of the housing; and
   wherein the first inlet port is provided in a duct of the first air after the lamp.

* * * * *